US011518430B2

(12) United States Patent
Sano

(10) Patent No.: US 11,518,430 B2
(45) Date of Patent: Dec. 6, 2022

(54) WHEEL STEERING DEVICE

(71) Applicant: TOYOTA JIDOSHA KABUSHIKI KAISHA, Toyota (JP)

(72) Inventor: Katsuyuki Sano, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/361,814

(22) Filed: Jun. 29, 2021

(65) Prior Publication Data

US 2021/0403078 A1 Dec. 30, 2021

(30) Foreign Application Priority Data

Jun. 30, 2020 (JP) .............................. JP2020-113303

(51) Int. Cl.
*B62D 5/04* (2006.01)
*B60G 3/26* (2006.01)
*B62D 7/18* (2006.01)
*B62D 7/15* (2006.01)

(52) U.S. Cl.
CPC ............. *B62D 5/0418* (2013.01); *B60G 3/26* (2013.01); *B62D 7/1581* (2013.01); *B62D 7/18* (2013.01); *B60G 2200/44* (2013.01)

(58) Field of Classification Search
CPC ...... B62D 7/18; B62D 7/1581; B62D 5/0418; B60G 3/26
See application file for complete search history.

(56) References Cited

U.S. PATENT DOCUMENTS

| 4,978,131 | A | * | 12/1990 | Edahiro | B62D 7/15 |
| | | | | | 280/93.51 |
| 4,984,818 | A | * | 1/1991 | Achleitner | B60G 3/26 |
| | | | | | 280/124.141 |
| 6,561,304 | B1 | * | 5/2003 | Henry | B62D 7/06 |
| | | | | | 180/402 |
| 6,568,697 | B1 | * | 5/2003 | Brill | B62D 7/09 |
| | | | | | 280/124.134 |
| 9,308,933 | B2 | * | 4/2016 | Lickfold | B62D 15/029 |
| 11,319,997 | B2 | * | 5/2022 | Gao | B62D 5/0418 |
| 2001/0054801 | A1 | * | 12/2001 | Perello | B62D 5/0418 |
| | | | | | 280/5.52 |
| 2009/0292421 | A1 | * | 11/2009 | Williams | B62D 5/04 |
| | | | | | 701/42 |

(Continued)

FOREIGN PATENT DOCUMENTS

| CN | 106741144 A | * | 5/2017 | |
| EP | 1757469 A1 | * | 2/2007 | ........... B60G 17/005 |

(Continued)

OTHER PUBLICATIONS

JP 2007001564 A machine translation from dialog May 2022.*

*Primary Examiner* — Paul N Dickson
*Assistant Examiner* — Maxwell L Meshaka
(74) *Attorney, Agent, or Firm* — Sughrue Mion, PLLC

(57) ABSTRACT

A wheel steering device for a vehicle, including: a steering knuckle that constitutes a part of a suspension device and that is capable of moving relative to a body of the vehicle in an up-down direction, the steering knuckle holding a wheel such that the wheel is rotatable; and a steering actuator configured to cause the steering knuckle to be pivoted about a kingpin axis so steer the wheel, wherein a caster angle and a caster offset are both 0.

9 Claims, 5 Drawing Sheets

(56) References Cited

U.S. PATENT DOCUMENTS

| | | | |
|---|---|---|---|
| 2018/0201319 A1* | 7/2018 | Rogers | B60G 15/068 |
| 2020/0223478 A1 | 7/2020 | Sano | |
| 2020/0331339 A1* | 10/2020 | Nagayama | B60K 7/0007 |
| 2021/0008939 A1* | 1/2021 | Schmidt | B62D 7/146 |
| 2021/0170825 A1* | 6/2021 | Jang | B62D 7/06 |

FOREIGN PATENT DOCUMENTS

| | | | |
|---|---|---|---|
| JP | H06183234 A | * | 7/1994 |
| JP | 2007-001564 A | | 1/2007 |
| JP | 2007-326467 A | | 12/2007 |
| JP | 2013112113 A | * | 6/2013 |
| JP | 2020-111270 A | | 7/2020 |

\* cited by examiner

FIG.4

$$M_x = \frac{-\delta_2 \cos\phi_s}{A} F_X \quad \text{①}$$

$$M_y = \frac{\delta_3 \cos\phi_k}{B} F_Y \quad \text{②}$$

$$M_z = \frac{\delta_1 \tan\phi_s - \delta_4 \tan\phi_k}{C} F_Z \quad \text{③}$$

WHEEL STEERING DEVICE

CROSS REFERENCE TO RELATED APPLICATION

The present application claims priority to Japanese Patent Application No. 2020-113303, which was filed on Jun. 30, 2020, the disclosure of which is herein incorporated by reference in its entirety.

BACKGROUND

Technical Field

The following disclosure relates to a wheel steering device installed on a vehicle to steer a wheel of the vehicle.

Description of Related Art

It is well known in the field of vehicles that an alignment is changed due to a force that acts on a wheel from a road surface on which the wheel runs. In a case where the wheel is a steerable wheel, the force influences a steering angle of the wheel. In view of this, various attempts to improve a wheel steering device have been made as disclosed in Patent Document 1 (Japanese Patent Application Publication No. 2007-326467), for instance. The disclosed wheel steering device achieves a suspension geometry that allows a kingpin offset to be 0.

SUMMARY

The technique described in the Patent Document 1 is one example of an improvement of the wheel steering device, and it is possible to improve the utility of the wheel steering device by a technique other than that described in the Patent Document 1. Accordingly, an aspect of the present disclosure is directed to a wheel steering device with high utility.

In one aspect of the present disclosure, a wheel steering device for a vehicle includes:
a steering knuckle that constitutes a part of a suspension device and that is capable of moving relative to a body of the vehicle in an up-down direction, the steering knuckle holding a wheel such that the wheel is rotatable; and
a steering actuator configured to cause the steering knuckle to be pivoted about a kingpin axis to steer the wheel,
wherein a caster angle and a caster offset are both 0.

The wheel steering device constructed according to the present disclosure is less susceptible to a change in a steering angle of the wheel (that is a concept similar to "slip angle") even if a force that moves the wheel upward and downward acts on the wheel due to unevenness or irregularities of the road surface. In other words, a wheel steering device (hereinafter simply referred to as "steering device" where appropriate) can be achieved in which action of a force that causes a steering knuckle to be pivoted about a kingpin axis is small.

Various Forms

In the wheel steering device according to the present disclosure (hereinafter simply referred to as "present wheel steering device" or "present steering device" where appropriate), a caster angle and a caster offset are defined as follows. In a case where the kingpin axis and a line extending vertically from a center of a ground contacting area of a tire of the wheel (hereinafter referred to as "vertical line" where appropriate) are projected on a plane normal to a rotation axis of the wheel (hereinafter referred to as "wheel axis" where appropriate), the caster angle is defined as an angle formed by the kingpin axis and the vertical line, and the caster offset is defined as a horizontal distance between the wheel axis and the kingpin axis when viewed in a direction in which the wheel axis extends (hereinafter referred to as "wheel axis direction" where appropriate). The feature that the caster angle and the caster offset are both 0 in the present steering device means that the caster angle and the caster offset are substantially 0, in other words, about 0.

When the wheel and the vehicle body move relative to each other in the up-down direction, namely, in a bound/rebound motion of the wheel and the vehicle body, it is estimated that at least one of the caster angle and the caster offset changes due to a change in the alignment. In view of this, it is desirable that both the caster angle and the caster offset be 0 at least when a relative position of the vehicle body and the wheel in the up-down direction, namely, a stroke position, is equal to a normal position (i.e., a design position at which the wheel and the vehicle body neither bound nor rebound). It is more desirable that both the caster angle and the caster offset be maintained at 0 even when the wheel and the vehicle body bound or rebound to a certain extent. Specifically, it is desirable that both the caster angle and the caster offset be maintained at substantially 0 in a range defined by two stroke positions on opposite sides of the normal position, i.e., a range defined by i) a stroke position at which a stroke amount from the normal position is ½ of a stroke amount in a full rebound state and ii) a stroke position at which a stroke amount from the normal position is ½ of a stroke amount in a full bound state, in other words, a range defined by two stroke positions on opposite sides of the normal position, i.e., a range defined by i) a stroke position corresponding to ½ of a stroke position in a full rebound state and ii) a stroke position corresponding to ½ of a stroke position in a full bound state.

For setting both the caster angle and the caster offset to 0 in the wheel steering device that employs a strut-type suspension device, for instance, both i) a center of a ball joint coupling the steering knuckle and a lower arm and ii) a pivot center of an upper support for supporting upper ends of a shock absorber and a suspension spring so as to be rotatable relative to the vehicle body are designed to overlap the vertical line when viewed in the wheel axis direction.

In a case where the steering knuckle is supported by the vehicle body through the lower arm, a pivot axis of the lower arm relative to the vehicle body (hereinafter referred to as "arm pivot axis" where appropriate) is preferably horizontal. Here, the concept that the pivot axis of the lower arm is horizontal includes a concept that the pivot axis is substantially horizontal. In a case where the steering knuckle is supported by the thus configured lower arm, dependence of changes in the caster angle and the caster offset on a change in the relative position of the vehicle body and the wheel in the up-down direction can be made considerably small.

The present steering device may be configured such that the steering actuator is capable of steering the wheel independently of other wheels. That is, the steering device may be configured to steer only one of the right wheel and the left wheel of a four-wheeled vehicle independently of the other of the right wheel and the left wheel. In other words, the steering device may be a single-wheel independent steering device.

In a case where the present steering device is the single-wheel independent steering device, the kingpin offset is desirably 0. Here, the concept that the kingpin offset is 0 includes a concept that the kingpin offset is substantially 0. The kingpin offset is defined as a distance in the wheel axis direction between: the center of the ground contacting area of the tire; and a point of intersection of the kingpin axis and the ground contacting area of the tire. Here, a force that is externally applied to the wheel or the steering knuckle to cause the steering knuckle to be pivoted about the kingpin axis is referred to as an external force. When a driving force or a braking force (hereinafter each referred to as "longitudinal force" where appropriate) is applied to the vehicle, the external force that arises from the longitudinal force acts on the steering knuckle. The external force that arises from the longitudinal force is applied to the right and left steering knuckles as forces in mutually opposite directions. In a steering device in which the right and left steering knuckles are coupled to each other by a steering rod or the like (hereinafter referred to as "both-wheel steering device" where appropriate), the forces that act on the right and left steering knuckles in mutually opposite directions are offset and do not influence steering of the right and left wheels. In the single-wheel independent steering device, however, the right and left steering knuckles are not coupled to each other. Accordingly, the external force that arises from the longitudinal force influences steering of the wheel. In a case where a wheel drive device of an in-wheel motor type is employed, the influence of the driving force can be made small by setting the kingpin offset to 0. In a case where a wheel brake device such as a disc brake is employed, the influence of the braking force can be made small by setting the kingpin offset to 0. The kingpin offset is preferably 0 at least when the stroke position is equal to the normal position.

In a case where the present steering device is the single-wheel independent steering device, the steering actuator may be disposed on the lower arm. The single-wheel independent steering device in which the steering actuator is disposed on the lower arm can be easily modularized together with the suspension device, the brake device, and the wheel drive device. In other words, a wheel mounting module in which the steering device, the suspension device, the brake device, and the wheel drive device are incorporated can be easily constructed, thus facilitating mounting the steering device on the vehicle body.

The present steering device may be configured such that the steering actuator includes an electric motor as a drive source. In this instance, the steering actuator may be configured to assist an operation force applied to an operating member by the driver or may be configured to apply, to the steering knuckle, a force for steering the wheel (hereinafter referred to as "steering force" where appropriate) without depending on the operation force. That is, the present steering device may be an electric power steering device or a steer-by-wire steering device.

In a case where the steering actuator includes the electric motor as the drive source or in a case where the present steering device is the steer-by-wire steering device, the present steering device may include a controller configured to control the steering device, and the controller may be configured to control a supply current to the electric motor based on a deviation of the steering angle of the wheel with respect to a target steering angle. In this case, the controller may be configured to determine the target steering angle based on an operation of the operating member by the driver. This configuration is referred to as a typical configuration. In the typical configuration, the steering angle of the wheel varies due to the external force described above, so that the electric current is supplied to the electric motor. In other words, when the wheel is steered due to the external force during straight running of the vehicle, the electric current is supplied to the electric motor to cancel the steering of the wheel. As explained above, the present steering device is less susceptible to a change in the steering angle of the wheel even when the external force in the up-down direction acts on the wheel, making it possible to reduce the supply current to the electric motor. In other words, the typical configuration enables an energy-saving steering device to be achieved.

In the present steering device, the caster angle and the caster offset are both 0, so that a self-aligning torque, namely, a force for restoring the non-steered state of the wheel is small. This may cause a possibility of giving an unnatural feeling to the steering operation by the driver in the steering device configured to steer the wheel in dependence on the operation force of the operating member. In a case where the present steering device is constructed as the steer-by-wire steering device, however, there may be provided a reaction-force applying device configured to apply an operation reaction force to the operating member, and the operation reaction force may be appropriately controlled to provide an appropriate feeling of the steering operation.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 4 indicates arithmetical expressions each representing a moment applied to a steering knuckle by an external force;

DETAILED DESCRIPTION OF THE EMBODIMENT

Figure 1:
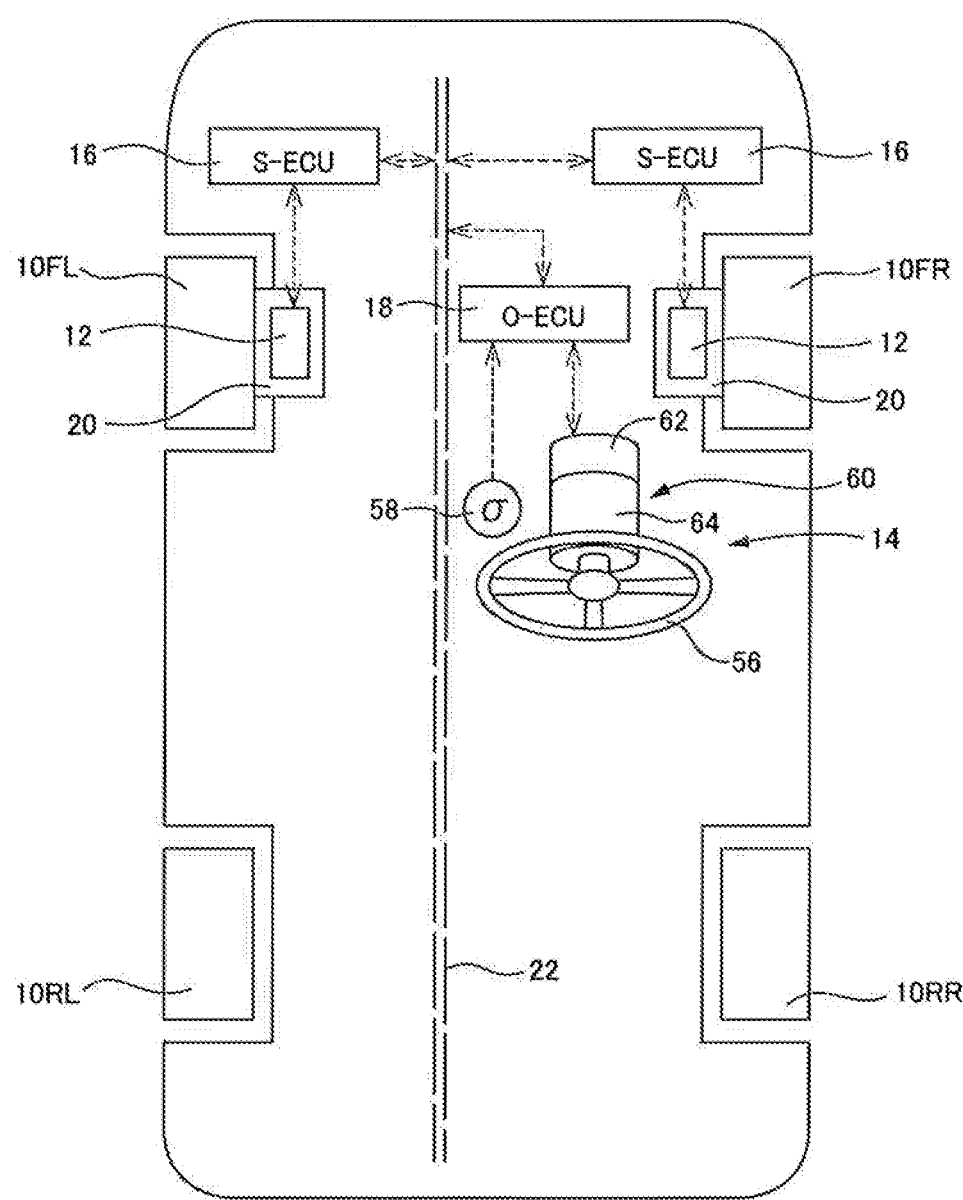
FIG. 1 is a schematic view of a vehicle steering system including a wheel steering device according to one embodiment.

Referring to the drawings, there will be explained below in detail a wheel steering device according to one embodiment of the present disclosure. It is to be understood that the present disclosure is not limited to the details of the following embodiment but may be embodied based on the forms described in Various Forms and may be changed and modified based on the knowledge of those skilled in the art.

A. Structure of Vehicle Steering System

A steering system for a vehicle including a wheel steering device according to the present embodiment (hereinafter simply referred to as "steering system" where appropriate) is what is called steer-by-wire steering system. As schematically illustrated in FIG. 1, the steering system is installed on a vehicle having front left and right wheels 10FL, 10FR and rear left and right wheels 10RL, 10RR. The steering system includes: a pair of wheel steering devices 12 configured to steer the front left and right wheels 10FL, 10FR, respectively; an operating device 14 configured to receive an operation by a driver; a pair of steering electronic control units (hereinafter each abbreviated as "steering ECU" where appropriate) 16 for controlling the corresponding wheel steering devices 12; and an operation electronic control unit (hereinafter referred to as "operation ECU" where appropriate) 18 for controlling the operating device 14 and for performing overall control of the two steering ECUs 16. Each of the wheel steering devices 12 is a wheel steering device according to the present embodiment. In the following explanation, when it is not necessary to distinguish the front left and right wheels 10FL, 10FR from each other, each of them will be referred to as the front wheel 10F. When it is not necessary to distinguish the rear left and right wheels 10RL, 10RR from each other, each of them will be referred to as the rear wheel 10R. When it is not necessary to distinguish the front wheel 10F and the rear wheel 10R from each other, each of them will be simply referred to as the wheel 10.

The two wheel steering devices 12 are incorporated into respective two wheel mounting modules 20 that will be explained. The pair of steering ECUs 16 and the operation ECU 18 are connected to a CAN (car area network or controllable area network) 22 and can communicate with each other via the CAN 22. In the present steering system, the pair of steering ECUs 16, the operation ECU 18, and the CAN 22 constitute a controller configured to control each of the wheel steering devices 12.

Figure 2:
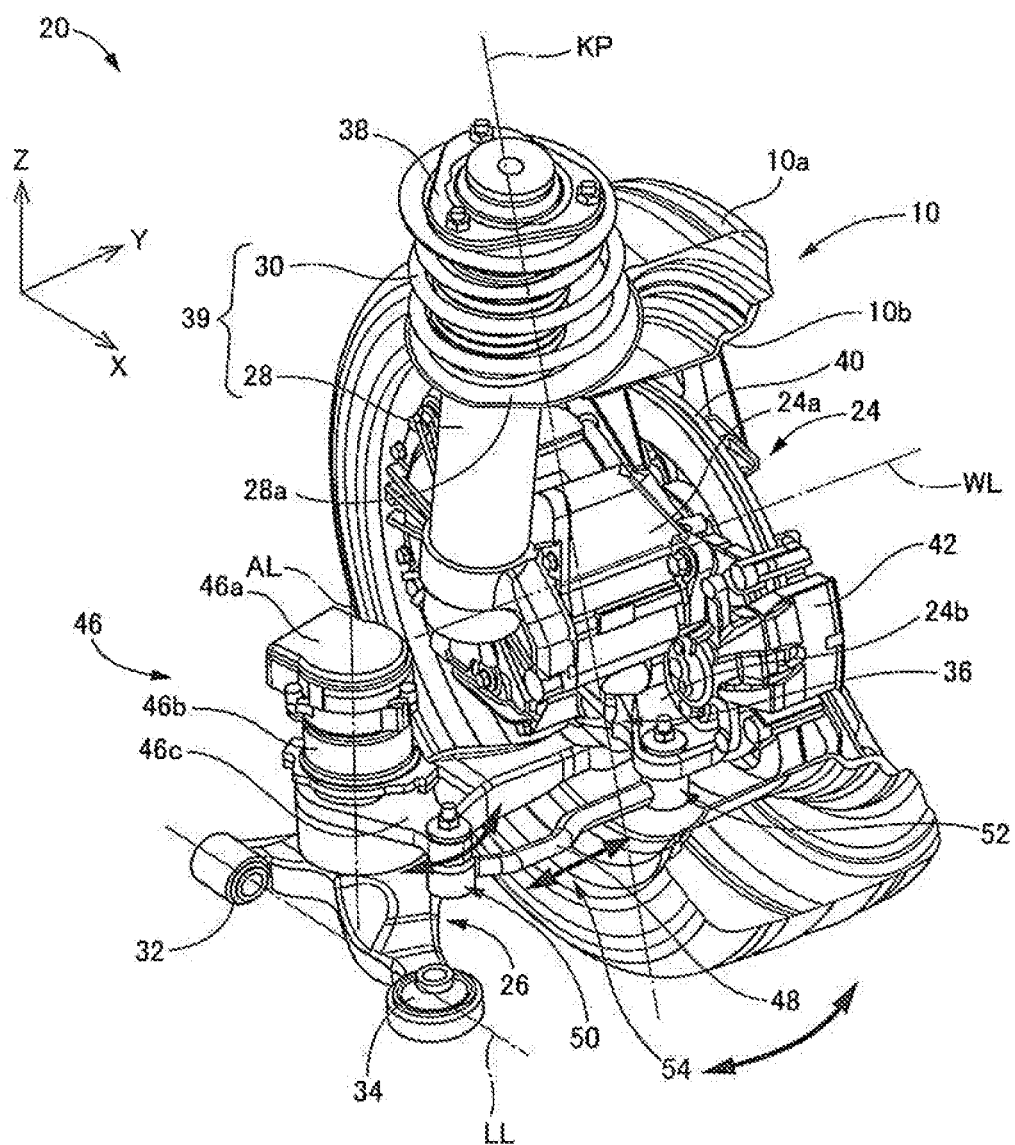
FIG. 2 is a perspective view of a wheel mounting module including the wheel steering device of the embodiment.

As illustrated in FIG. 2, the wheel mounting module (hereinafter simply referred to as "module" where appropriate) 20 is for mounting, on a body of the vehicle, a wheel 10b to which a tire 10a is mounted. Though the wheel 10b itself may be regarded as the wheel, the wheel 10b to which the tire 10a is attached is referred to as the wheel 10 in the present embodiment for convenience sake.

The module 20 includes a wheel drive unit 24 as a wheel driving and rotating device. The wheel drive unit 24 includes: a housing 24a; a drive motor that is an electric motor as a drive source and a speed reducer configured to reduce rotation of the drive motor (both the drive motor and the speed reducer are housed in the housing 24a and not illustrated in FIG. 2); and an axle hub to which the wheel 10b is attached. (The axle hub is hidden and invisible in FIG. 2). The wheel drive unit 24 is disposed inside a rim of the wheel 10b. The wheel drive unit 24 is what is called in-wheel motor unit. The wheel drive unit 24 has a well-known structure, and explanation thereof is dispensed with.

The module 20 includes a MacPherson-type suspension device (also referred to as a MacPherson strut type suspension device). In the suspension device, the housing 24a of the wheel drive unit 24 functions as a carrier that rotatably holds the wheel and also as a steering knuckle of the wheel steering device 12. The housing 24a is allowed to move upward and downward relative to the vehicle body. That is, the housing 24a is movable relative to the vehicle body in the up-down direction. The suspension device is constituted by a lower arm 26 as a suspension arm, the housing 24a of the wheel drive unit 24, a shock absorber 28, and a suspension spring 30.

The suspension device has an ordinary structure and will be briefly explained. The lower arm 26 is an L-shaped arm. A proximal end portion of the lower arm 26 is divided into two portions in the front-rear direction of the vehicle. The lower arm 26 is supported at the proximal end portion thereof by a side member (not shown) of the vehicle body through a first bushing 32 and a second bushing 34, so as to be pivotable about a horizontal arm pivot axis LL. The housing 24a of the wheel drive unit 24 is pivotally coupled at a lower portion thereof to a distal end portion of the lower arm 26 through a ball joint 36, as a first joint, for use in coupling the lower arm 26. (The ball joint 36 will be hereinafter referred to as "first joint 36" where appropriate.)

The shock absorber 28 is fixedly supported at a lower end thereof to the housing 24a of the wheel drive unit 24 and is rotatably supported at an upper end thereof by an upper portion of a tire housing of the vehicle body through an upper support 38. The suspension spring 30 is rotatably supported at an upper end thereof by the upper portion of the tire housing of the vehicle body through the upper support 38 and is supported at a lower end thereof by a lower support 28a in the form of a flange provided on the shock absorber 28. That is, the suspension spring 30 and the shock absorber 28 are disposed in parallel between the lower arm 26 and the vehicle body to form a spring-absorber assembly (assy) 39.

The module 20 includes a brake device. The brake device includes: a disc rotor 40 attached to the axle hub together with the wheel 10b and configured to rotate with the wheel 10; and a brake caliper 42 held by the housing 24a of the wheel drive unit 24 such that the brake caliper 42 straddles the disc rotor 40. Though not explained in detail, the brake caliper 42 includes: brake pads each as a friction member; and a brake actuator including an electric motor and configured to stop rotation of the wheel 10 by pushing the brake pads against the disc rotor 40 by the force of the electric motor. The brake device is an electric brake device configured to generate a braking force in dependence on the force generated by the electric motor.

The module 20 includes the wheel steering device 12 according to the present embodiment. The wheel steering device 12 is a single-wheel independent steering device for steering only one of the pair of right and left wheels 10 independently of the other of the pair of right and left wheels. The wheel steering device 12 includes the housing 24a of the wheel drive unit 24 functioning as the steering knuckle, a steering actuator 46 provided on the lower arm 26 at a position close to the proximal end portion of the lower arm 26, and a tie rod 48 coupling the steering actuator 46 and the steering knuckle 24a. The housing 24a of the wheel drive unit 24 will be referred to as "steering knuckle 24a" when treated as a constituent element of the wheel steering device 12.

The steering actuator 46 includes a steering motor 46a that is an electric motor as a drive source, a speed reducer 46b for decelerating rotation of the steering motor 46a, and an actuator arm 46c functioning as a pitman arm and configured to be pivoted by the rotation of the steering motor 46a decelerated by the speed reducer 46b. A proximal end portion of the tie rod 48 is coupled to the actuator arm 46c through a ball joint 50, as a second joint, for use in coupling the proximal end portion of the tie rod 48. (The ball joint 50 will be hereinafter referred to as "second joint 50" where appropriate.) A distal end portion of the tie rod 48 is coupled to a knuckle arm 24b of the steering knuckle 24a through a ball joint 52, as a third joint, for use in coupling the distal end portion of the tie rod 48. (The ball joint 52 will be hereinafter referred to as "third joint 52" where appropriate.)

In the wheel steering device 12, a line connecting the center of the upper support 38 and the center of the first joint 36 is a kingpin axis KP. By the motion of steering motor 46a, the actuator arm 46c of the steering actuator 46 pivots about an actuator axis AL as indicated by a bold arrow in FIG. 2, and the pivotal movement of the actuator arm 46c is transmitted to the steering knuckle 24a by the tie rod 48, so that the steering knuckle 24a is rotated about the kingpin axis KP. That is, the wheel 10 is steered as indicated by a bold arrow in FIG. 2. Thus, the wheel steering device 12 includes a motion converting mechanism 54 constituted by the actuator arm 46c, the tie rod 48, the knuckle arm 24b, etc., for converting the rotating motion of the steering motor 46a into the steering motion of the wheel 10.

In the wheel steering device 12, the steering actuator 46 is disposed on the lower arm 26. Thus, a work of mounting the module 20 on the vehicle body can be easily performed. That is, the proximal end portion of the lower arm 26 is attached to the side member of the vehicle body, and the upper support 38 is attached to the upper portion of the tire housing of the vehicle body, whereby the module 20 including the suspension device, the brake device, and the wheel steering device can be mounted on the vehicle. In other words, the module 20 is excellent in mountability on the vehicle.

The operating device 14 has a configuration known in ordinary steer-by-wire systems. As illustrated in FIG. 1, the operating device 14 includes: a steering wheel 56, as a steering operating member, operable by the driver; a steering sensor 58 for detecting an operation angle that is a rotation angle of the steering wheel 56 as an operation position of the steering operating member; and a reaction-force applying device 60 configured to apply an operation reaction force to the steering wheel 56. The reaction-force applying device 60 includes a reaction force motor 62 that is an electric motor as a source of the reaction force and a speed reducer 64 for transmitting the force of the reaction force motor 62 to the steering wheel 56.

B. Control of Vehicle Steering System i) Steering Control

A steering control executed in the present steering system is for steering each of the two front wheels 10F at a steering angle $\psi$ corresponding to a steering request. The steering angle $\psi$ is synonymous with what is called steering position. Here, a position of each front wheel 10F at which the front wheel 10F should be located in a straight traveling state of the vehicle is defined as a straight-traveling-state position of the front wheel 10F, and the steering angle of the front wheel 10F at the straight-traveling-state position is defined as a reference steering angle. In this case, the steering angle $\psi$ may be regarded as a phase change amount from the reference steering angle, namely, a steering amount.

The steering control will be explained in detail. The operation ECU 18, as an electronic control unit, functions as a central controller and includes, as a main constituent element, a computer including a CPU, a ROM, a RAM, etc. The operation ECU 18 is configured to obtain, as a degree of a steering operation, an operation angle of the steering wheel 56 based on detection by the steering sensor 58, i.e., a steering operation position, a (hereinafter simply referred to as "operation position $\sigma$" where appropriate) and to determine a target steering angle $\psi^*$ that is the steering angle $\psi$ to be attained in each front wheel 10F, based on the obtained operation position $\sigma$ according to a set steering gear ratio. Here, a position of the steering wheel 56 for causing the vehicle to travel straight is defined as a straight-traveling-state position of the steering wheel 56. In this case, the operation position $\sigma$ is regarded as a position change amount from the straight-traveling-state position as a reference operation position, namely, a steering operation amount. In a strict sense, the steering operation position $\sigma$ takes values that are opposite in sign between a case in which the steering wheel 56 is operated clockwise with respect to the reference operation position and a case in which the steering wheel 56 is operated counterclockwise with respect to the reference operation position. Similarly, in a strict sense, the steering angle $\psi$ takes values that are opposite in sign between a case in which the wheel 10 is steered rightward with respect to the reference steering angle and a case in which the wheel 10 is steered leftward with respect to the reference steering angle.

The wheel steering device 12 is not equipped with a steering angle sensor for directly detecting the steering angle $\psi$ of the wheel 10. In the present steering system, therefore, the operation ECU 18 and the pair of steering ECUs 16 control the steering force generated by each steering actuator 46 based on a motion position of the steering motor 46a utilizing a specific relationship between the steering angle $\psi$ of the wheel 10 and the motion position of the steering motor 46a. The steering force generated by the steering actuator 46 and a steering torque $Tq_S$ that is a torque generated by each steering motor 46a are in a specific relationship relative to each other. Specifically, the steering force and the steering torque $Tq_S$ are generally proportional to each other. Accordingly, the operation ECU 18 determines, based on the motion position of the steering motor 46a, a target steering torque $Tq_S^*$ that is the steering torque $Tq_S$ to be generated by each steering motor 46a.

The steering motor 46a is a rotary-type motor. Accordingly, the motion position of the steering motor 46a is an angular position of a motor shaft, i.e., a motor rotation angle $\theta$. The motion position of the motor is regarded as a motion amount of the motor. Specifically, the motion position of the motor is regarded as a change amount of the motion position from a reference motor position that is a motion position of the motor in the straight traveling state of the vehicle. The motor rotation angle $\theta$ is regarded as a displacement angle form a reference motor rotation angle as the reference motor position in the straight traveling state of the vehicle. The motor rotation angle $\theta$ is accumulated over 360°. In the present wheel steering device 12, the steering motor 46a and the steering knuckle 24a are mechanically coupled to each other. Thus, a change amount of the motor rotation angle $\theta$ of the steering motor 46a and a change amount of the steering angle $\psi$ of the wheel are in a specific relationship relative to each other. It is generally considered that there is established, between the change amount of the motor rotation angle $\theta$ and the change amount of the steering angle $\psi$, a relationship based on a predetermined ratio that depends on a speed reduction ratio of the speed reducer 46b, etc. By utilizing the relationship, the steering angle $\psi$ of the wheel 10 is controlled by controlling the motor rotation angle $\theta$, instead of directly controlling the steering angle $\psi$. In a strict sense, the motor rotation angle $\theta$ takes values that are opposite in sign between a state in which the steering motor 46a rotates forwardly with respect to the reference motor rotation angle and a state in which the steering motor 46a rotates reversely with respect to the reference motor rotation angle.

The target steering torque $Tq_S^*$ is determined as follows. Based on the target steering angle $\psi^*$, the operation ECU 18 determines, for each wheel 10, a target motor rotation angle $\theta^*$ (as a target motion position) that is a target of the motor rotation angle $\theta$. The steering motor 46a is a brushless DC motor and includes a motor rotation angle sensor (such as a Hall IC, a resolver or the like) for phase switching in electric current supply thereto. Based on the detection by the motor rotation angle sensor, each steering ECU 16 recognizes an actual motor rotation angle θ that is the motor rotation angle θ at the present time with respect to the reference motor rotation angle. Each steering ECU 16 transmits information on the actual motor rotation angle θ to the operation ECU 18 via the CAN 22. The operation ECU 18 obtains, for each wheel 10, a motor rotation angle deviation Δθ as a motion-position deviation. The motor rotation angle deviation Δθ is a deviation of the motor rotation angle θ with respect to the target motor rotation angle θ. Based on the motor rotation angle deviation Δθ (=θ*−θ), the target steering torque $Tq_S^*$ is determined according to the following expression:

$$Tq_S^* = G_P \cdot \Delta\theta + G_D \cdot (d\Delta\theta/dt) + G_I \int \Delta\theta dt$$

The above expression is an expression according to a feedback control law based on the motor rotation angle deviation Δθ. The first term, the second term, and the third term in the expression are a proportional term, a derivative term, and an integral term, respectively. Further, $G_P$, $G_D$, and $G_I$ represent a proportional gain, a derivative gain, and an integral gain, respectively.

The operation ECU 18 transmits information on the target steering torque $Tq_S^*$ to the steering ECU 16 of each wheel 10 via the CAN 22. Each steering ECU 16 controls the corresponding steering motor 46a based on the target steering torque $Tq_S^*$. The steering torque $Tq_S$ and a supply current $I_S$ to the steering motor 46a are in a specific relationship relative to each other. Specifically, the steering torque $Tq_S$ depends on the force generated by the steering motor 46a, and the steering torque $Tq_S$ and the supply current $I_S$ are generally proportional to each other. Accordingly, each steering ECU 16 determines a target supply current $I_S^*$ that is a target of the supply current Is to the steering motor 46a based on the target steering torque $Tq_S^*$ determined by the operation ECU 18 and supplies the target supply current $I_S^*$ to the corresponding steering motor 46a. Specifically, each steering ECU 16 includes a computer that executes processing for determining the target supply current $I_S$, for instance, and an inverter, as a drive circuit, connected to the computer. Based on the target supply current $I_S^*$ determined by the computer, the electric current $I_S$ is supplied from the inverter to the steering motor 46a.

In the steering control explained above, the steering force generated by each of the wheel steering devices 12, namely, the steering torque $Tq_S$, is controlled, whereby the steering angle ψ of each of the right and left wheels 10 is controlled so as to be equal to the target steering angle ψ*. In the steering control, the target steering torque $Tq_S^*$ is determined based on the deviation Δθ for the motor rotation angle θ associated with the steering angle ψ. Based on the determined target steering torque $Tq_S^*$, the target supply current $I_S^*$ to the steering motor 46a is determined. That is, in the steering control, the supply current $I_S$ to the steering motor 46a is controlled based on a deviation Δψ of the steering angle ψ of the wheel 10 with respect to the target steering angle ψ*.

ii) Operation Reaction Force Control

The operation ECU 18 executes a control for applying, to the steering wheel 56, an operation reaction force that is a reaction force against the steering operation, i.e., an operation reaction force control. The operation reaction force control is an ordinary control, and the operation reaction force can be determined according to various techniques. In the present steering system, the operation ECU 18 determines, as a target operation reaction force, a target reaction force torque $Tq_C^*$ that is a reaction force torque $Tq_C$ (as one sort of the operation reaction force) to be generated by the reaction force motor 62 of the reaction-force applying device 60, according to a typical technique, namely, according to the following expression:

$$Tq_C^* = G\sigma \cdot \sigma + G_v \cdot v$$

In the above expression, Gσ, $G_v$ are weighting gains respectively relating to the steering operation position σ and the vehicle speed v. That is, the reaction force torque $Tq_C$ to be applied increases with an increase in the steering operation position σ and with an increase in the vehicle speed v. The operation ECU 18 identifies the vehicle speed v based on wheel speeds $v_W$ of the respective two front wheels 10F each of which depends on the rotation speed of the drive motor of the corresponding wheel drive unit 24.

The operation ECU 18 determines, based on the target reaction force torque $Tq_C^*$ determined as described above, the target supply current $I_C^*$ that is a target of the supply current $I_C$ to the reaction force motor 62 and supplies, to the reaction force motor 62, the electric current $I_C$ based on the target supply current $I_C^*$. The operation ECU 18 includes a drive circuit (driver) of the reaction force motor 62. The electric current $I_C$ is supplied to the reaction force motor 62 through the drive circuit.

C. Influences of External Force Based on Suspension Geometry and Elimination of Influences of External Force i) Wheel Steering Device Having Ordinary Suspension Geometry Referring to the schematic views of FIGS. 3A and 3B, there will be explained a suspension geometry in a case where the module 20 includes an ordinary strut-type suspension device. Here, a rotation axis of the wheel 10 is defined as a wheel axis WL. A line that passes a center SC of a ground contacting area of the wheel 10 and that is perpendicular to the ground contacting area is defined as a vertical line VL. As apparent from FIG. 3A viewed in a wheel axis direction in which the wheel axis WL extends and FIG. 3B viewed in the front-rear direction of the vehicle, the vertical line VL intersects the wheel axis WL at right angles, in other words, the wheel axis WL is parallel to the road surface. In the following explanation, the wheel axis direction in which the wheel axis WL extends is referred to as a Y direction, the up-down direction is referred to as a Z direction, and a direction perpendicular to and horizontal with the wheel axis direction is referred to as an X direction, as illustrated in FIG. 2. In a state in which the wheel 10 is not steered, the X direction coincides with the front-rear direction of the vehicle.

As explained above, the line connecting the center of the first joint 36 and the center of the upper support 38 (i.e., a supporting center of the spring-absorber assy 39 with respect to the vehicle body) is the kingpin axis KP. Here, a plane normal to the wheel axis WL is defined as "XZ plane", and a plane parallel to the wheel axis WL and normal to the road surface is defined as a YZ plane. An angle formed by the kingpin axis KP and the vertical line VL on the XZ plane when the kingpin axis KP and the vertical line VL are projected on the XZ plane is a caster angle $\varphi_S$. An angle formed by the kingpin axis KP and the vertical line VL on the YZ plane when the kingpin axis KP and the vertical line VL are projected on the YZ plane is a kingpin angle $\varphi_K$.

Figure 3B:
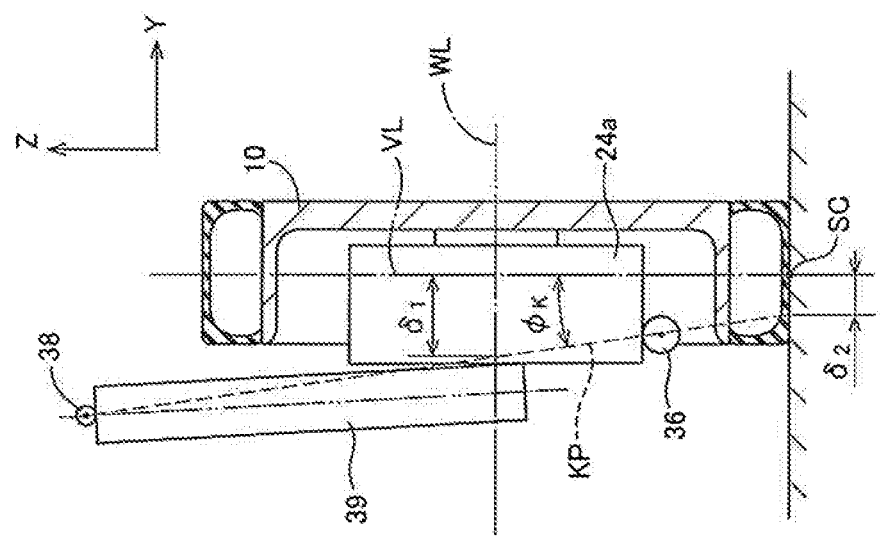
FIG. 3B is a schematic view for explaining the suspension geometry of the wheel mounting module illustrated in FIG. 2.
Figure 3A:
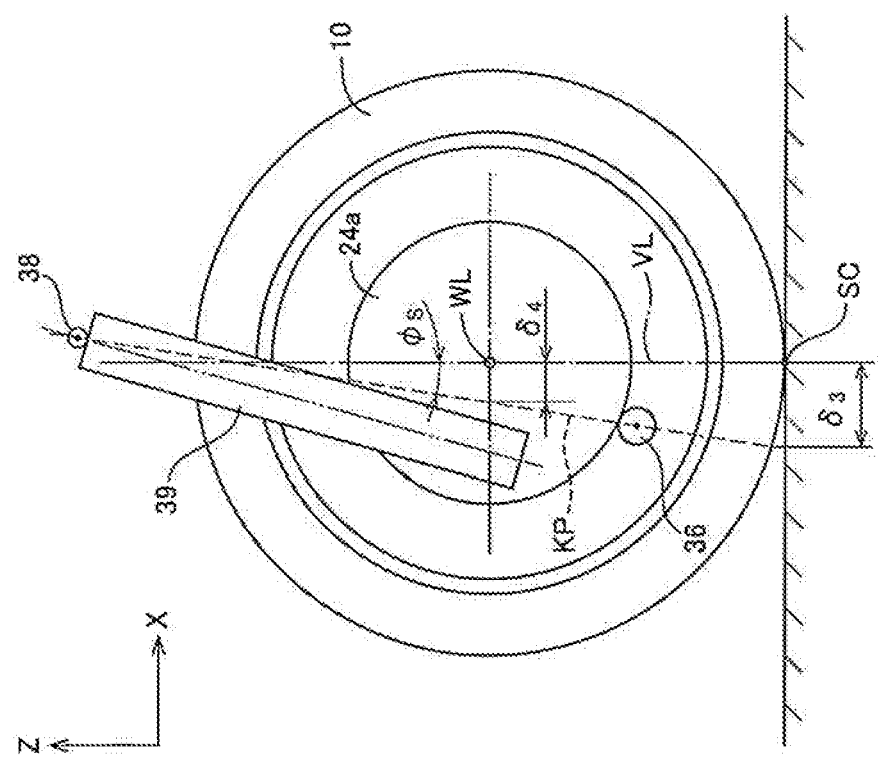
FIG. 3A is a schematic view for explaining a suspension geometry of the wheel mounting module illustrated in FIG. 2.

As illustrated in FIG. 3B, a horizontal distance on the YZ plane between: a point of intersection of the wheel axis WL and the vertical line VL; and the kingpin axis KP is a spindle offset $\delta_1$. A distance in the wheel axis direction between: a point of intersection of the kingpin axis KP and the ground contacting area; and the center SC of the ground contacting area is a kingpin offset $\delta_2$. As illustrated in FIG. 3A, a distance on the XZ plane between: the center SC of the ground contacting area; and the point of intersection of the kingpin axis KP and the ground contacting area is a caster trail $\delta_3$. A horizontal distance on the XZ plane between: the wheel axis WL and the kingpin axis KP is a caster offset $\delta_4$. Though not illustrated in FIGS. 3A and 3B, the ground contacting area actually has a certain size, and the kingpin axis KP passes the ground contacting area.

A case is considered in which a force $F_X$ in the front-rear direction of the vehicle (i.e., a longitudinal force $F_X$), a force $F_Y$ in the width direction of the vehicle (i.e., a lateral force $F_Y$), or a force $F_Z$ in the up-down direction (i.e., an up-down force $F_Z$) externally acts on the wheel 10, namely, the force $F_X$, the force $F_Y$, or the force $F_Z$ acts on the wheel 10 from the road surface each as an external force. In a strict sense, the force $F_X$, the force $F_Y$, or the force $F_Z$ acts on the wheel 10 at the center SC of the ground contacting area. The wheel 10 is steered by the longitudinal force $F_X$, the lateral force $F_Y$, or the up-down force $F_Z$ applied thereto. In other words, the steering knuckle 24a is rotated about the kingpin axis KP. Here, moments applied to the steering knuckle 24a by the longitudinal force $F_X$, the lateral force $F_Y$, and the up-down force $F_Z$ are respectively referred to as a longitudinal-force-dependent moment $M_x$, a lateral-force-dependent moment $M_y$, and an up-down-force-dependent moment $M_z$. The longitudinal-force-dependent moment $M_x$, the lateral-force-dependent moment $M_y$, and the up-down-force-dependent moment $M_z$ are respectively represented by expressions of FIG. 4. In this respect, A, B, and C in the respective expressions are coefficients determined by the caster angle $\varphi_S$ and the kingpin angle $\varphi_K$.

When the up-down force $F_Z$ that arises from unevenness or irregularities of the road surface acts on the wheel 10, the wheel 10 is steered by the action of the up-down force $F_Z$. In this case, the actual steering angle $\psi$ in the steering control changes, so that the electric current $I_S$ is supplied to the steering motor 46a for causing the steering angle $\psi$ to become equal to the target steering angle $\psi^*$. Similarly, when the longitudinal force $F_X$ that arises from application of the driving force or the braking force to the vehicle acts on the wheel 10 or when the lateral force $F_Y$ that arises from a crosswind applied to the vehicle acts on the wheel 10, the wheel 10 is steered. To cancel the steering, the electric current $I_S$ is supplied to the steering motor 46a. Supplying the electric current $I_S$ that results from the up-down force $F_Z$, the lateral force $F_Y$, or the longitudinal force $F_X$ is unfavorable in terms of energy consumption of the vehicle.

The steering direction of the right wheel 10 and the steering direction of the left wheel 10 that arise from the longitudinal force $F_X$ are mutually opposite. In the both-wheel steering device in which the steering knuckles of the right and left wheels are coupled by a steering rod or the like, the longitudinal-force-dependent moments $M_x$ for the right and left wheels 10 are offset. Thus, in the both-wheel steering device, the action of the longitudinal force $F_X$ on the right and left wheels 10 does not cause any problem in terms of energy consumption. Though the steering directions of the right and left wheels 10 that arise from the up-down force $F_Z$ are not necessarily always mutually opposite, the up-down-force-dependent moments $M_z$ for the right and left wheels 10 are somewhat offset in the both-wheel steering device. In other words, energy consumption due to the steering of the wheel 10 that arises from the longitudinal force $F_X$ and the up-down force $F_Z$ is problematic and serious because the present wheel steering device 12 is the single-wheel independent steering device. The action of the lateral force $F_Y$ causes the lateral-force-dependent moments $M_y$ for the right and left wheels 10 acting in the same direction. Accordingly, the lateral-force-dependent moments $M_y$ for the right and left wheels 10 cannot be offset even in the both-wheel steering device.

The relative position of the vehicle body and the wheel 10 in the up-down direction, namely, the stroke position, changes when the number of occupants in the vehicle changes or when the weight of baggage loaded on the vehicle changes. The change in the stroke position causes a change in the alignment. That is, the caster angle $\varphi_S$, the kingpin angle $\varphi_K$, the spindle offset $\delta_1$, the kingpin offset $\delta_2$, the caster trail $\delta_3$, and the caster offset $\delta_4$ change, thereby causing changes in the longitudinal-force-dependent moment $M_x$, the lateral-force-dependent moment $M_y$, and the up-down-force-dependent moment $M_z$. It is estimated that the alignment change causes the electric current $I_S$ to be supplied to the steering motor 46a. Specifically, it may be considered that the up-down force $F_Z$ corresponding to a load of the vehicle body shared by each wheel 10 is constantly acting on the wheel 10. In a case where the up-down force $F_Z$ changes due to a change in the number of occupants in the vehicle or due to a change in the amount of baggage loaded on the vehicle, for instance, the wheel 10 is steered by an amount corresponding to the change in the up-down force $F_Z$. In this instance, the electric current $I_S$ is kept supplied to the steering motor 46a for maintaining the steering angle $\psi$ at the target steering angle $\psi^*$.

ii) Wheel Steering Device of Present Embodiment

In consideration of the supply of the electric current to the steering motor 46a due to the external force, the suspension geometry is specially designed in the wheel steering device 12 of the present embodiment, namely, in the wheel mounting module 20 in which is incorporated the wheel steering device 12 of the present embodiment.

Referring to FIGS. 3A and 3B, the suspension geometry in the present wheel steering device 12 will be explained in detail. In the present wheel steering device 12, the caster angle $\varphi_S$ is 0 (0°) and the caster offset $\delta_4$ is 0 at least when the stroke position is equal to a normal position (i.e., a design position at which the wheel 10 and the vehicle body neither bound nor rebound). In other words, the center position of the first joint 36 and the center position of the upper support 38 are located on the vertical line VL when viewed in the wheel axis direction. Owing to this configuration, the up-down-force-dependent moment $M_z$ is made equal to 0, namely, the up-down-force-dependent moment $M_z$ is prevented from being generated, even if the up-down force $F_Z$ acts on the wheel 10, as apparent from the third expression in FIG. 4.

According to the third expression in FIG. 4, the up-down-force-dependent moment $M_z$ is prevented from being generated by setting the spindle offset $\delta_1$ to 0 and the kingpin angle $\varphi_K$ to 0 (0°). It is, however, difficult to satisfy this condition because it is desirable to provide the first joint 36 inside the rim of the wheel 10b.

Because the caster angle $\varphi_S$ is equal to 0° ($\varphi_S=0°$) and the caster offset $\delta_4$ is equal to 0 ($\delta_4=0$), the caster trail $\delta_3$ is also equal to 0. Owing to this configuration, the lateral-force-dependent moment $M_Y$ is made equal to 0, namely, the lateral-force-dependent moment $M_y$ is prevented from being generated, even if the lateral force $F_Y$ acts on the wheel 10, as apparent from the second expression in FIG. 4. The second expression in FIG. 4 is based on an assumption that the lateral force $F_Y$ acts on the wheel 10 at the center SC of the ground contacting area. In a strict sense, the point of action of the lateral force $F_Y$ is shifted or offset in the front-rear direction by an amount corresponding to a pneumatic trail. Thus, the lateral-force-dependent moment $M_y$ cannot be made equal to 0, namely, it is difficult to prevent the lateral-force-dependent moment $M_y$ from being generated.

In the wheel mounting module 20 in which is incorporated the wheel steering device 12 of the present embodiment, the kingpin offset $\delta_2$ is set to 0 at least when the stroke position is equal to the normal position. Owing to this configuration, the longitudinal-force-dependent moment $M_x$ is made equal to 0, namely, the longitudinal-force-dependent moment $M_x$ is prevented from being generated, even if the longitudinal force $F_X$ acts on the wheel 10, as apparent from the first expression in FIG. 4.

Figure 5B:
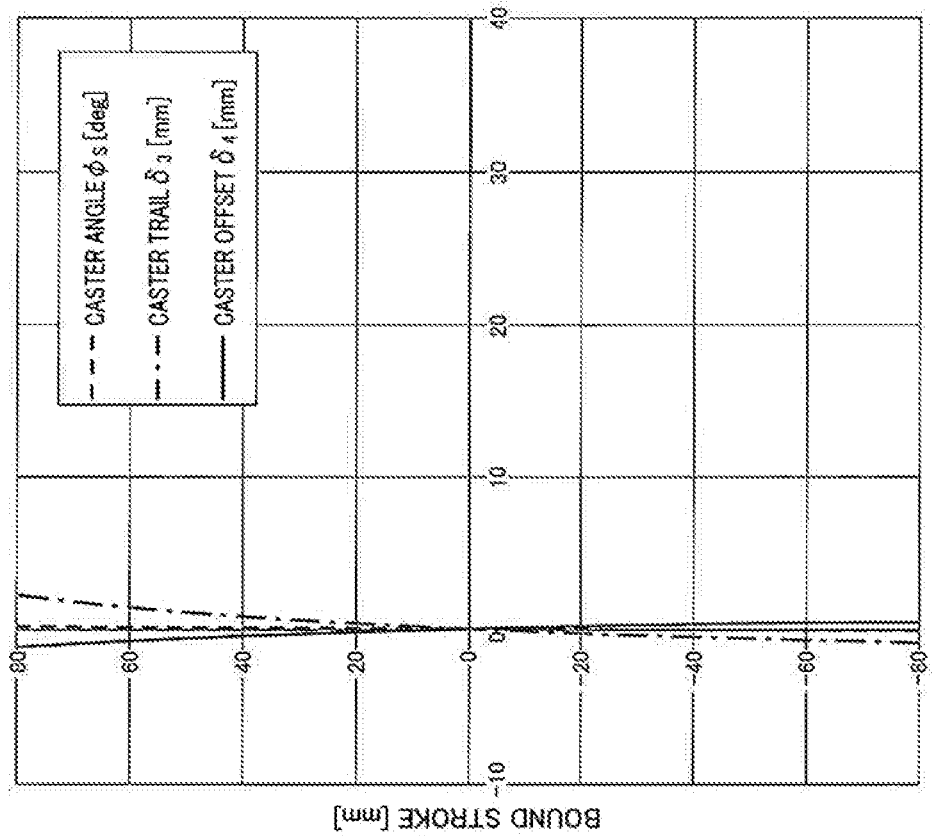
FIG. 5B is a graph for explaining an alignment change in a relative movement of a vehicle body and a wheel in an up-down direction in the wheel mounting module into which is incorporated the wheel steering device of the present embodiment.
Figure 5A:
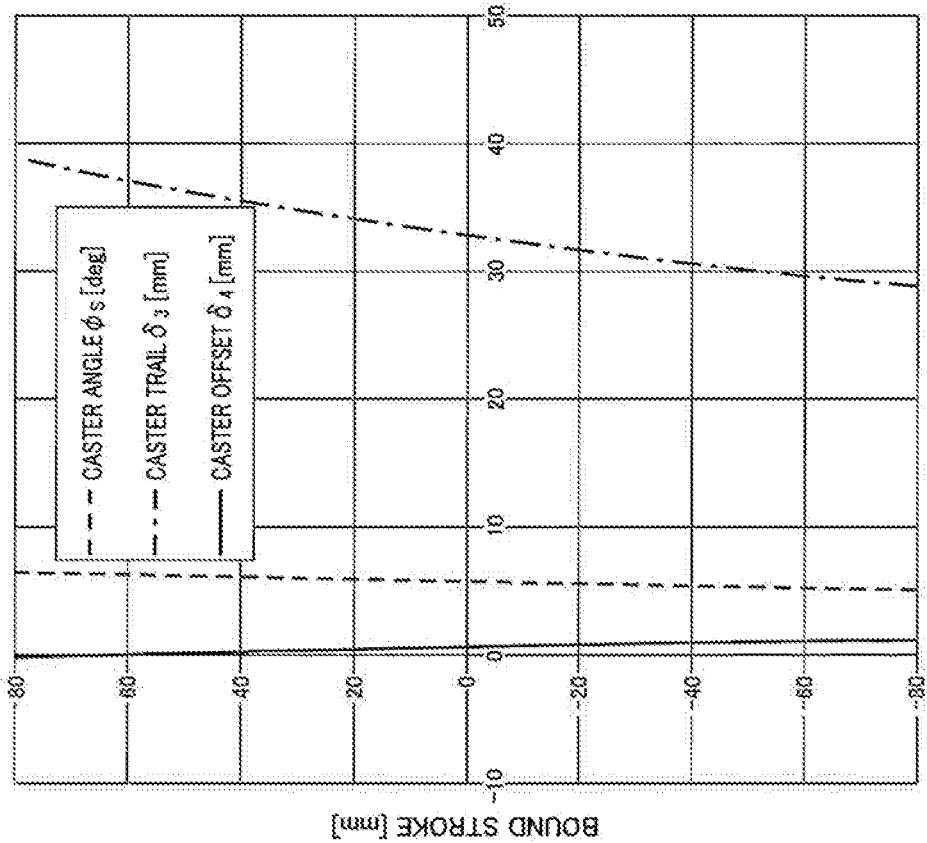
FIG. 5A is a graph for explaining an alignment change in a relative movement of a vehicle body and a wheel in an up-down direction in an ordinary suspension device.

Referring to each of graphs of FIGS. 5A and 5B, there will be explained an alignment change with respect to a change in the stroke position. FIG. 5A shows an alignment change in an ordinary strut-type suspension device while FIG. 5B shows an alignment change in the wheel mounting module 20 in which is incorporated the wheel steering device 12 of the present embodiment. In the alignment change shown in FIG. 5B, both the caster angle $\varphi_S$ and the caster offset $\delta_4$ are maintained at substantially 0 in a range defined by two stroke positions on opposite sides of the normal position, i.e., a range defined by i) a stroke position at which a stroke amount from the normal position is ½ of a stroke amount in a full bound state and ii) a stroke position at which a stroke amount from the normal position is ½ of a stroke amount in a full rebound state. Accordingly, the caster trail $\delta_3$ is also maintained at substantially 0 within the range.

The configuration in which the arm pivot axis LL is horizontal (FIG. 2) also contributes to maintaining the caster angle cps, the caster offset $\delta_4$, and the caster trail $\delta_3$ at substantially 0 within the range indicated above. Though not indicated in the graph of FIG. 5B, the kingpin offset $\delta_2$ is made equal to substantially 0 at the normal position.

In the wheel steering device 12 of the present embodiment in which the suspension geometry is designed as described above, even when the external force such as the longitudinal force $F_X$, the lateral force $F_Y$, or the up-down force $F_Z$ acts on the wheel 10, the wheel 10 is unlikely to be steered by the action of the external force, thus resulting in less chance of the electric current being supplied to the steering motor 46a. That is, the wheel steering device 12 that is excellent in terms of energy saving is constructed.

What is claimed is:

1. A wheel steering device of a steer-by-wire configuration for a vehicle, comprising:
    a steering knuckle that constitutes a part of a suspension device and that is capable of moving relative to a body of the vehicle in an up-down direction, the steering knuckle holding a wheel such that the wheel is rotatable; and
    a steering actuator configured to cause the steering knuckle to be pivoted about a kingpin axis to steer the wheel, the steering actuator being disposed on a lower arm and having an actuator arm configured to pivot the steering knuckle,
    wherein a caster angle and a caster offset are both 0,
    wherein the wheel steering device is configured to enable the wheel to be steered based on an operation of an operating member by a driver of the vehicle, and
    wherein the wheel steering device is used with a reaction-force applying device configured to controllably apply an operation reaction force to the operating member.

2. The wheel steering device according to claim 1, wherein the steering knuckle is supported by the body of the vehicle through the lower arm, the lower arm constitutes the suspension device and that is pivotable relative to the body of the vehicle about a horizontal pivot axis.

3. The wheel steering device according to claim 1, wherein the steering actuator enables the wheel to be steered independently of other wheels of the vehicle.

4. The wheel steering device according to claim 3, wherein a kingpin offset is 0.

5. The wheel steering device according to claim 3, wherein the steering knuckle is supported by the body of the vehicle through the lower arm, the lower arm constitutes the suspension device, and the steering actuator is disposed on the lower arm.

6. The wheel steering device according to claim 1, wherein the steering actuator includes an electric motor as a drive source.

7. The wheel steering device according to claim 6, further comprising a controller configured to control a supply current to the electric motor based on a deviation of a steering angle of the wheel with respect to a target steering angle.

8. The wheel steering device according to claim 7, wherein the controller is configured to determine the target steering angle based on an operation of an operating member by a driver of the vehicle.

9. A wheel mounting module for mounting a wheel on a body of a vehicle, comprising:
    a suspension device including a lower arm and a carrier supported by the lower arm and rotatably holding the wheel, the carrier being capable of moving in an up-down direction relative to the body of the vehicle;
    a wheel drive device including a wheel drive unit, a housing of which functions as the carrier;
    a brake device including a caliper held by the housing of the wheel drive unit; and
    a wheel steering device including i) a steering knuckle as the carrier, ii) a steering actuator including an electric motor as a drive source and disposed on the lower arm, the steering actuator being configured to cause the steering knuckle to be pivoted about a kingpin axis to steer the wheel, and iii) an actuator arm,
    wherein a caster angle and a caster offset are both 0 in a state in which the wheel mounting module is mounted on the body of the vehicle,
    wherein the wheel steering device is of a steer-by-wire type and is configured to enable the wheel to be steered based on an operation of an operating member by a driver of the vehicle, and
    wherein the wheel steering device is used with a reaction-force applying device configured to controllably apply an operation reaction force to the operating member.

* * * * *